Jan. 29, 1952     O. E. UECKER     2,584,100
HIGH-PRESSURE CLOSURE
Filed Feb. 7, 1949
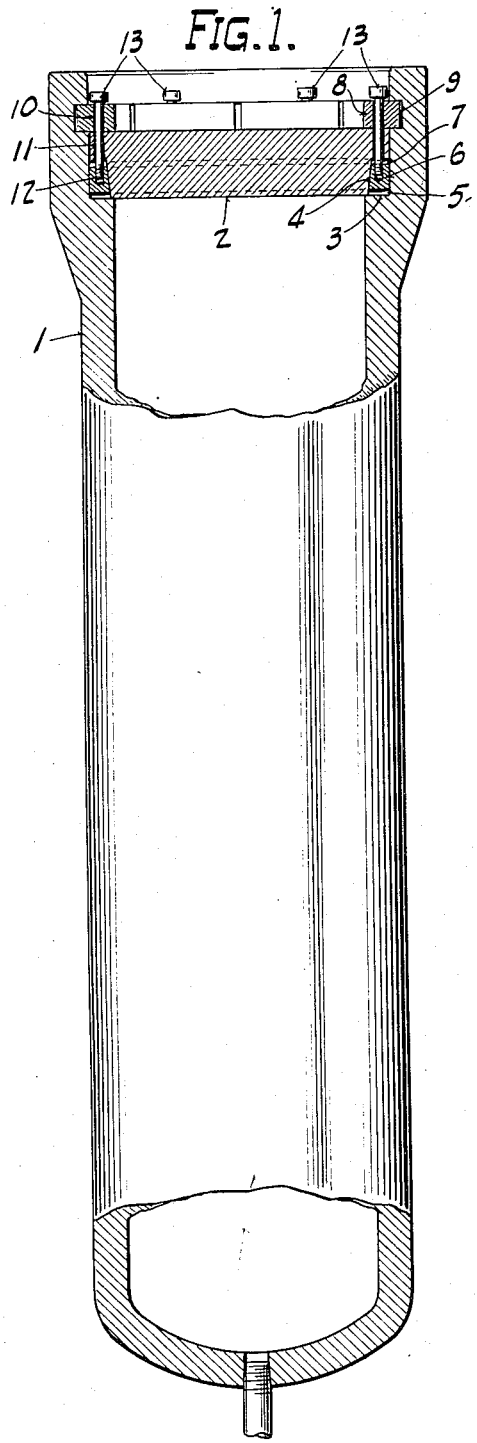
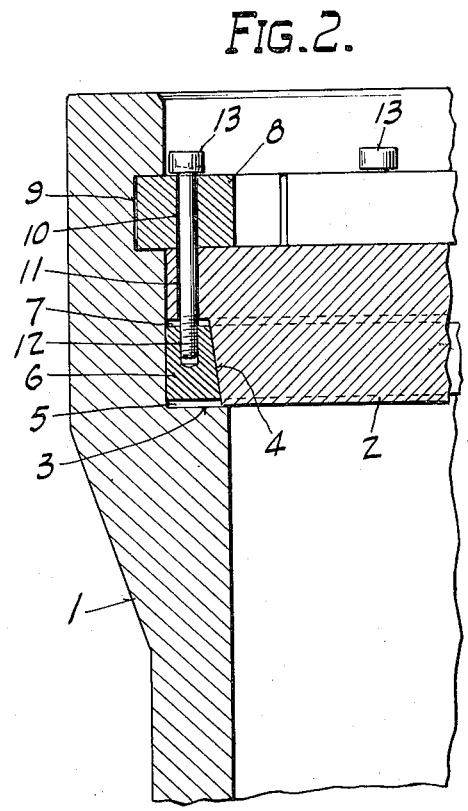
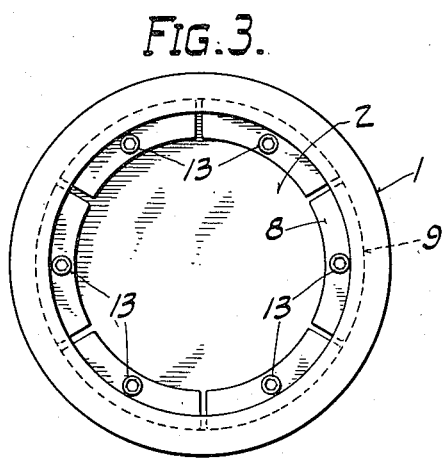
INVENTOR.
Otto E. Uecker
BY Andrus & Sceales
ATTORNEYS.

Patented Jan. 29, 1952

2,584,100

UNITED STATES PATENT OFFICE 2,584,100

HIGH-PRESSURE CLOSURE

Otto E. Uecker, Milwaukee, Wis., assignor to A. O. Smith Corporation, Milwaukee, Wis., a corporation of New York Application February 7, 1949, Serial No. 74,960

1 Claim. (Cl. 220—46)

This invention relates to a high pressure closure for pressure vessels in which internal pressure of substantial pounds per square inch is developed.

One object of the invention is to provide a high pressure closure for a pressure vessel which is self-sealing.

Another object is to provide a pressure vessel closure which automatically seals more tightly upon increase of pressure within the vessel.

These and other objects of the invention will appear hereinafter in connection with the following description of the invention illustrated in the accompanying drawing:

In the drawing:

Figure 1 is a side elevational view of a pressure vessel embodying the invention with parts broken away and sectioned;

Figure 2 is a longitudinal sectional view through the closure assembly for the vessel; and Figure 3 is a top end view of the assembly.

The pressure vessel illustrating the invention comprises a shell 1 formed closed at one end and closed at the other end by the removable end head 2.

Head 2 is disposed within shell 1 and seats on an annular shoulder 3 provided on the inside of shell 1 to limit the inward movement of the head. With respect to the invention, the manner of limiting inward movement of head 2 is of little account since means outside the vessel may be employed to limit the inward movement of head 2.

The inner portion of the periphery 4 of the head 2 directly above shoulder 3 is recessed circumferentially of the head to provide the annular space 5 between the inner portion of the head and shell 1. Periphery 4 of head 2 is of conical shape so that the cross-section of space 5 at the inner end is greater than at the outer end.

A gasket ring 6 of a generally conical shape for wedging purposes is disposed in space 5 between head 2 and shell 1. The taper of ring 6 on the inside periphery thereof is complementary to periphery 4 of head 2 and the ring fits tightly within space 5 with a slight clearance 7 provided between the outer end of the ring and head 2 for movement of the ring outwardly under internal pressure within the vessel as will be described. Ring 6 may be of copper or stainless steel or of carbon steel sprayed with aluminum or copper. The stainless steel as well as the carbon steel may also be sprayed with a soft metal to improve the sealing action of the ring.

The material of the ring depends on the pressures and temperatures to which it may be subjected. In some constructions, rings of rubber, plastic or similar material might be employed.

Head 2 is held in place within the vessel by a segmental shear ring 8 which is assembled within an annular groove 9 on the inside of shell 1 directly to the outside of head 2. The segments of ring 8 project over the outer end of head 2 and a plurality of vertical holes 10 extend through ring 8 in axial alignment with holes 11 in head 2 and threaded holes 12 in sealing ring 6. Threaded holes 12 are blind holes as they do not extend completely through ring 6, and therefore offer no problem of leakage therethrough.

The screws 13 extend through the respective holes in ring 8 and head 2 and are threaded into the holes 12 in sealing ring 6. Screws 13 keep the segments of shear ring 8 in place and when threaded home into sealing ring 6 tighten or wedge ring 6 between the head and shell within space 5 to obtain initial sealing of the assembly before pressures are developed internally of the vessel.

A slight clearance is provided between the body portions of screws 12 and ring 8 and head 2 so that the screws are free to float relative to these members as internal pressures within the vessel increase and sealing ring 6 tends to be forced outwardly.

When sealing ring 6 is forced outwardly by internal pressures within the vessel, ring 6 is tightly wedged between the head and shell and the greater the pressure exerted thereon, the more effective the sealing action of the ring. This is due to the conical shape of the ring and the mating surface on head 2. The ring 6 as it is forced outwardly tends to wedge more tightly into the tapered cavity 5 between the wall of the vessel and head 2.

The closure is readily assembled. Sealing ring 6 may first be placed over periphery 4 of head 2 and is then readily guided by shell 1 inwardly as head 2 is moved in until it seats on shoulder 3. A slight clearance is provided between the outer portion of the periphery of the head and shell 1 to permit ready insertion of head 2 into the shell. The screw holes 12 in ring 6 must of course be carefully aligned with holes 11 in head 2 and this may be accomplished by various devices.

Next the segments of shear ring 8 are inserted in groove 9 of the shell to the outside of head 2 with the holes 10 therethrough aligned with holes 11 in the head. Thereafter, screws 13 are inserted through holes 10 and 11 and threaded into holes 12 in sealing ring 6 to hold the segments of ring 8 against radial movement and at the same time draw ring 6 outwardly to some extent within space 5 to initially seal off the end head closure. As described, as internal pressure develops, ring 6 tends to be forced outwardly and is free to move in an outward direction in wedging relation to the head and shell due to clearances between the screws and the members through which they extend and the slight clearance between the outer end of ring 6 and head 2. The sealing closure provided automatically self-seals and at the same time can be assembled in an initial sealing position. The blind holes in the gasket into which the screws are threaded or otherwise secured insures that there will be no leakage through the gasket itself.

Various embodiments of the invention may be employed within the scope of the accompanying claim.

I claim:

A high pressure closure for a vessel comprising, a shell having a generally cylindrical open end to be closed, said shell being formed with an internal shoulder facing said open end and spaced inwardly thereof and having an internal groove between said shoulder and said open end, a tapered head fitting within the cylindrical open end of said shell with the inner end of said head having a lesser diameter than the outer end of said head to provide a diverging recess between the head and the shell, a sealing ring disposed within said recess and having a surface to complement the taper of said head, a plurality of retaining segments disposed within the internal groove and in contacting relation with the head to prevent outward movement of said head, a plurality of securing members freely extending through said segments and partially threaded into said sealing ring to retain said segments within said groove and to draw the ring outwardly and wedge said ring between the head and the shell to initially seal the joint therebetween, and said sealing ring automatically sealing itself tightly between the head and shell as the ring is forced axially outward by the pressure developed internally of said shell.

OTTO E. UECKER.

REFERENCES CITED

The following references are of record in the file of this patent:

UNITED STATES PATENTS

| Number | Name | Date |
|---|---|---|
| 848,493 | Redenbaugh | Mar. 26, 1907 |
| 1,835,963 | Nevius | Dec. 8, 1931 |
| 2,001,458 | Dunn | May 14, 1935 |
| 2,133,934 | Ericsson et al. | Oct. 18, 1938 |
| 2,237,029 | Fischer | Apr. 1, 1941 |
| 2,273,186 | Fischer | Feb. 17, 1942 |
| 2,385,754 | Baker | Sept. 25, 1945 |